United States Patent [19]

Crabb

[11] 4,063,464

[45] Dec. 20, 1977

[54] AGRICULTURAL TRACTOR TRANSMISSION

[75] Inventor: Elmer R. Crabb, Pekin, Ill.

[73] Assignee: Caterpillar Tractor Co., Peoria, Ill.

[21] Appl. No.: 619,340

[22] Filed: Oct. 3, 1975

[51] Int. Cl.² ............................................. F16H 3/08
[52] U.S. Cl. ................................................... 74/331
[58] Field of Search ............. 74/329, 330, 331, 665 F, 74/665 G, 665 GA

[56] References Cited

U.S. PATENT DOCUMENTS

| | | | |
|---|---|---|---|
| 2,861,480 | 11/1958 | Curtis | 74/330 |
| 3,318,167 | 5/1967 | Frost | 74/331 |
| 3,410,148 | 11/1968 | Clarke | 74/331 |
| 3,498,150 | 3/1970 | Funk | 74/331 |
| 3,710,637 | 1/1973 | Fisher | 74/331 |
| 3,753,376 | 8/1973 | Ribeiro | 74/665 GA |

Primary Examiner—Samuel Scott
Assistant Examiner—Wesley S. Ratliff, Jr.
Attorney, Agent, or Firm—Phillips, Moore, Weissenberger, Lempio & Majestic

[57] ABSTRACT

A vehicle transmission particularly suitable for an agricultural tractor provides a large number of drive ranges by combining manual selection of any of several speed ranges while the vehicle is stopped with power shifting being available while the vehicle is in motion. The arrangement of the transmission allows the input shaft to be located at the top of the housing, with a plurality of shafts carrying the shift assemblies located immediately below the input shaft. The output shaft is positioned in the lower portion of the housing providing output torque at both ends of the housing, thereby eliminating the need for a transfer case normally required in interconnecting a transmission to both the front and rear wheels of the vehicle.

9 Claims, 4 Drawing Figures

AGRICULTURAL TRACTOR TRANSMISSION

BACKGROUND OF THE INVENTION

This invention relates to transmissions for coupling an engine to the wheels of a vehicle and more particularly transmissions which require a large number of drive ranges to allow relatively constant and efficient engine speed over a broad range of vehicle speeds. Additionally, the invention relates to a transmission utilized in vehicles, particularly agricultural tractors, which utilize front and rear wheel drives.

Agricultural tractors have particular requirements for transmission of power to the vehicle wheels. Operation of the tractor is usually at a steady speed for long periods of time interrupted by brief periods of varying speed while the direction of the tractor and the particular work implement is changed. During the steady speed, it is desirable to maintain engine speed at its most efficient operating condition. Varying ground conditions encountered in the average agricultural application require a certain degree of flexibility in the transmission of torque during operation. This flexibility, which is deficient in present transmissions, requires a transmission which may be shifted to provide small increments of drive ratio change generally less than one mile per hour in order to achieve efficiency.

Tractors, and particularly agricultural tractors, usually incorporate a "four-wheel drive" arrangement which, in addition to a conventional transmission with an output shaft having a rearwardly facing drive coupling, generally include a transfer case. The transfer case is positioned in line and interconnected with the rearwardly facing output coupling and through appropriate gearing provides a forwardly facing drive coupling below the transmission. The associated drive shaft for transmitting power to the front wheels is affixed to the forwardly facing drive coupling and generally runs below the transmission. Such an arrangement, conventional in tractors, is expensive, complex, and introduces additional friction losses and necessitates a higher profile for the drive train with the inherent clearance problem of running a drive shaft under the transmission. Additionally, the forwardly running drive shaft is unnecessarily long, having to run from the front axle to a point to the rear of the transmission to couple with the transfer case.

In addition to the requirements for a flexible transmission and provision of means for delivering power forwardly and rearwardly, as described above, agricultural tractors have a specific requirement for a power take-off shaft to operate auxiliary equipment associated with the implement being utilized in the particular application. Generally, such a power take-off shaft in agricultural equipment is located at the rearward end of the tractor in order to properly interconnect with the associated implement.

Various agricultural tractors are on the market today which approach the conditions set forth above. However, the shift speeds while the tractor is under way generally vary from about 20% difference in speed up to about 25% difference in speed before a shift is required. In these cases, the power shifts available while the vehicle is in motion have been limited to three or less, with up to three additional manual shift gear ratios available while the tractor is stopped by direct engagement without an associated clutching unit. These transmissions currently utilized by the agricultural industry generally include planetary reduction arrangements with associated drive engagement means, and a transfer case which adds to the cost and weight of the vehicle, not to mention the inherent loss of efficiency in the rather complex arrangement.

SUMMARY OF THE INVENTION

Accordingly, this invention is a transmission for agricultural vehicles and the like which provides manual selection of any one of a large number of drive ratios while the vehicle is stopped and within each of these drive ratios provides an additional large number of drive ratios individually selectable while the vehicle is under way through a power shift capability. The arrangement of the transmission is unique in that input is supplied at the top of the transmission housing with the power shift section immediately therebelow, the manual shift section below the power shift section and the output shaft located at the bottom of the transmission housing. This positioning of the output shaft allows power connections at both ends of the transmission housing without a transfer case.

It is an object of this invention to provide a transmission particularly designed for the agricultural industry which efficiently operates under varying ground conditions and vehicle speeds resulting in more ground plowed per fuel dollar.

It is a further object of this invention to provide a transmission which, while fulfilling the above object, provides a large number of forward speeds and reverse speeds.

It is still a further object of this invention to provide a transmission for agricultural tractors which, while fulfilling the above objects, includes a plurality of power shifts for underway use allowing the operator to select the best speed in accordance with the ground conditions and operating restrictions of the implement associated with the tractor.

It is still an additional object of this invention to provide a transmission which fulfills the above objects, and includes a manual shift capability with a plurality of additional drive ranges, the manual shift accomplished by direct engagement using conventional shift forks and coupling collars.

It is still a further object of this invention to provide a transmission which delivers torque at both ends of the output shaft thereby allowing relatively simple interconnection with both the forward and rear vehicle drive wheels.

It is still a further object of this invention to provide a transmission which fulfills the above object, and is housed in a single transmission housing without the requirement for a separate transfer gear case.

It is an additional object of this invention to provide a transmission which incorporates a power take-off spline on the input shaft of the transmission.

It is also an object of this invention to provide a transmission which is economical, highly efficient and simple to manufacture.

Broadly stated, the invention is a transmission for a vehicle, the transmission includes a housing, an input shaft mounted in the housing and an output shaft also mounted in the housing. A plurality of drive gears is drivingly mounted on the input shaft, and a first and second intermediate shaft is mounted in a substantially parallel relationship to the input shaft each intermediate shaft carrying a plurality of intermediate drive gears rotatably mounted thereon, each intermediate drive gear engaging one of the drive gears drivingly mounted on the input shaft. Clutch means are provided for selectively engaging one of the plurality of intermediate drive gears with its respective intermediate shaft. First and second spur gears are drivingly mounted respectively on the first and second intermediate shafts and mesh with a cluster gear rotatably mounted on a transfer shaft. The transfer shaft is mounted in the housing in substantially parallel relation to the input shaft each intermediate shaft carrying a plurality of intermediate drive gears rotatably mounted thereon, each intermediate drive gear engaging one of the drive gears drivingly mounted on the input shaft. Clutch means are provided for selectively engaging one of the plurality of intermediate drive gears with its respective intermediate shaft. First and second spur gears are drivingly mounted respectively on the first and second intermediate shafts and mesh with a cluster gear rotatably mounted on a transfer shaft. The transfer shaft is mounted in the housing in substantially parallel relation to the input shaft. Rotatably mounted on the transfer shaft is a plurality of range gears each intermeshing with a countershaft spur gear drivingly mounted on a countershaft, the countershaft mounted in the housing in substantially parallel relation to the input shaft. The countershaft is driven by the cluster gear rotatably mounted on the transfer shaft engaging a countershaft drive gear drivingly mounted on the countershaft. A plurality of drive engagement means for selectively drivingly connecting the range gears to the transfer shaft and a transfer gear means interconnecting the transfer shaft with the output shaft for driving the output shaft are also provided.

These and other objects of the invention will become apparent from a study of the following description of the preferred embodiment and the accompanying drawings.

BRIEF DESCRIPTION OF THE DRAWINGS

FIG. 4 is a schematic diagram of the transmission illustrated in FIG. 3.

DETAILED DESCRIPTION OF THE DRAWINGS

Figure 1:
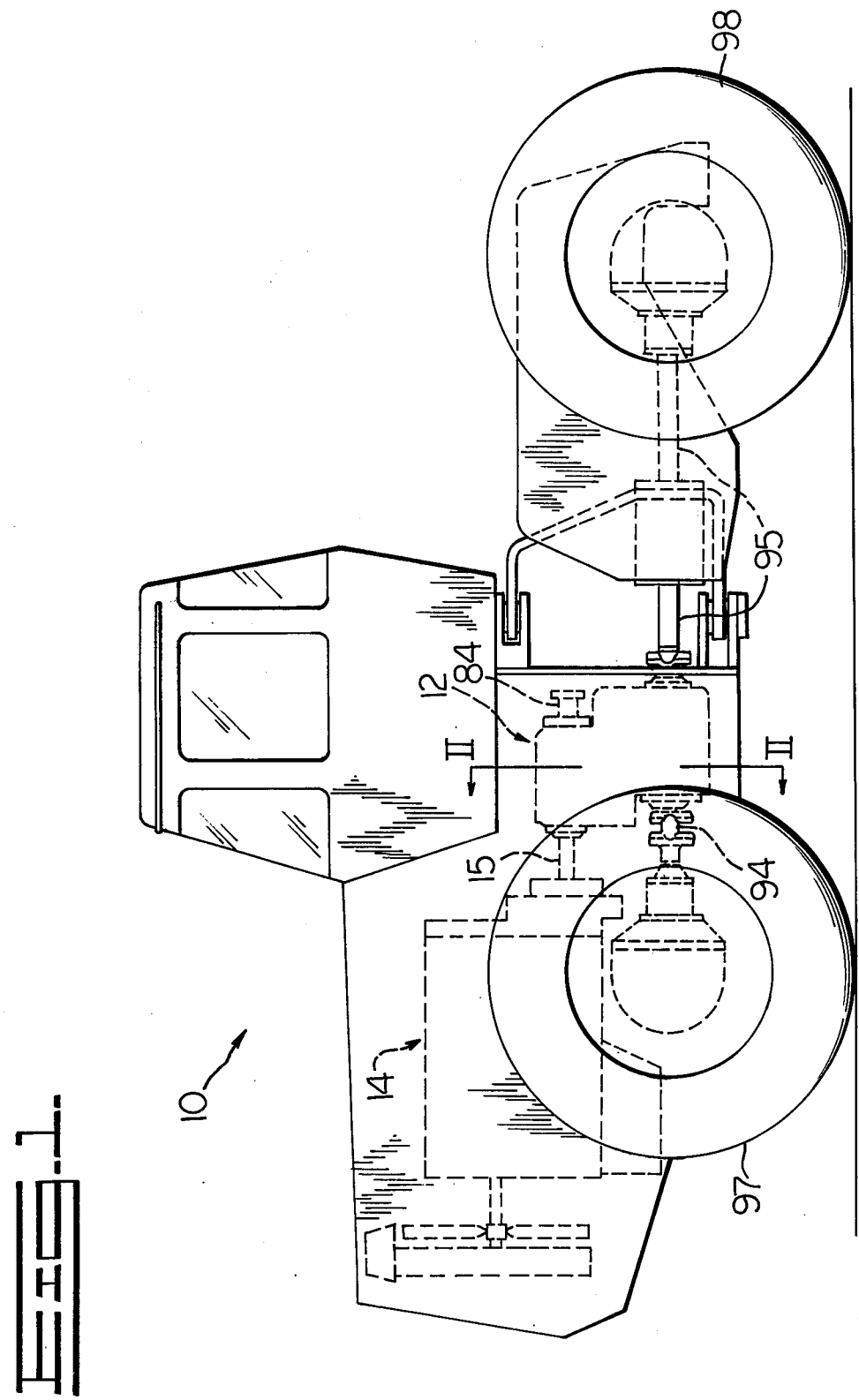
FIG. 1 is a side elevation of a transmission according to this invention and mounted in an agricultural tractor.

Referring to FIG. 1, a four wheel drive articulated tractor 10 adapted for agricultural use is shown with a transmission 12 installed therein. An engine 14 having a drive shaft 15 provides input torque to transmission 12. Such input torque is communicated to input shaft 16 (FIG. 3) of transmission 12. Input shaft 16 is rotatably mounted in a transmission housing 17 and has drivingly mounted thereon a plurality of drive gears. In the preferred embodiment shown in FIG. 3 two drive gears, first drive gear 20 and second drive gear 22 are mounted on input shaft 16.

Figure 2:
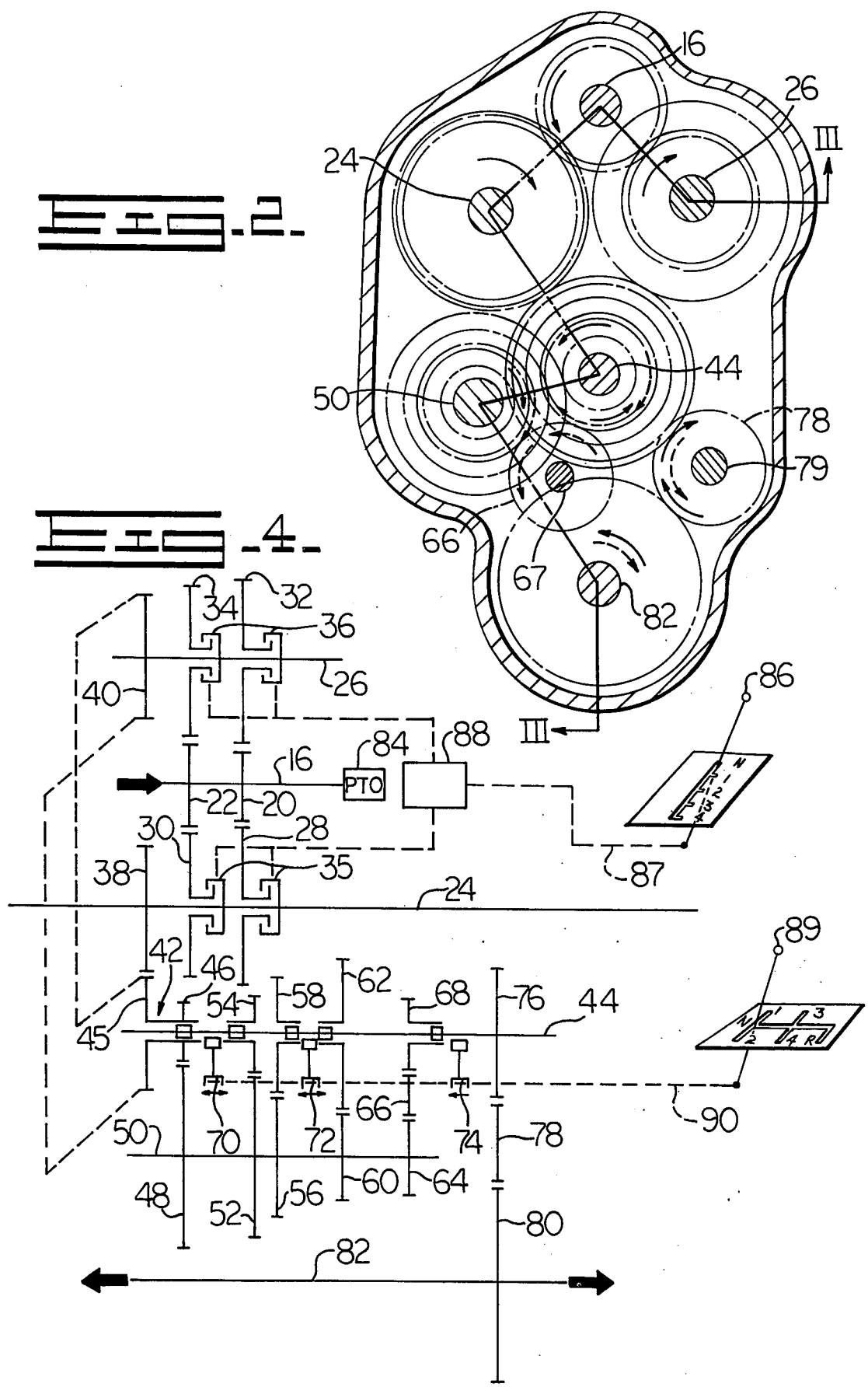
FIG. 2 is a sectional view of the transmission of FIG. 1 taken at II—II to show the vertical arrangement of the various shaft members.

Mounted adjacent to and below input shaft 16 is a power shift section 18 associated with a pair of intermediate shafts 24 and 26 (see FIG. 2). Power shift section 18 provides a plurality of selective drive ratios during underway operation. Referring again to FIG. 3, each intermediate shaft has mounted thereon a pair of intermediate drive gears, intermediate shaft 24 having intermediate drive gear 28 intermeshing with drive gear 20 to provide a first range drive ratio and intermediate drive gear 30 intermeshing with drive gear 22 to provide a second range drive ratio. Intermediate shaft 26 has mounted thereon an intermediate drive gear 32 also intermeshing with drive gear 20 to provide a third range drive ratio and intermediate drive gear 34 intermeshing with drive gear 22 to provide a fourth range drive ratio. Interposed between intermediate drive gear 28 and intermediate drive gear 30 is a first and second range clutch 35 of a type well known in the industry which allows selective engagement of intermediate drive gear 28 or intermediate drive gear 30 with intermediate shaft 24. Similarly, a third and fourth range clutch 36 is mounted on intermediate shaft 26 to allow selective engagement of intermediate drive gear 32 or intermediate drive gear 34 with intermediate shaft 26.

Mounted below power shift section 18 is a manual shift section 41 to provide additional drive ratios. Manual shift section 41 is driven by a first spur gear 38 mounted at one end of intermediate shaft 24, and also driven by a second spur gear 40 mounted at the corresponding end of intermediate shaft 26. Spur gear 38 and spur gear 40, of equal diameter, intermesh with a cluster gear 42 mounted on a transfer shaft 44. Transfer shaft 44 is rotatably mounted in housing 17 in substantially parallel relationship to input shaft 16 and located below input shaft 16 and immediately below intermediate shafts 24 and 26 (See FIG. 2). Cluster gear 42 is freely rotatable about transfer shaft 44 and consists of a spur gear 45 and a pinion gear 46. Pinion gear 46 is in intermeshing relationship with a countershaft drive gear 48 drivingly mounted on a countershaft 50, the countershaft 50 being rotatably mounted in housing 17 in parallel relation to input shaft 16, and offset and slightly below transfer shaft 44. Also drivingly mounted on countershaft 50 are a plurality of spur gears each in intermeshing relationship with a mating gear rotatably mounted on transfer shaft 44. Operation of drive engagement means, to be described forthwith, coaxially mounted on transfer shaft 44 drivingly engages a particular range gear with transfer shaft 44 thereby providing a particular reduction ratio.

Figure 3:
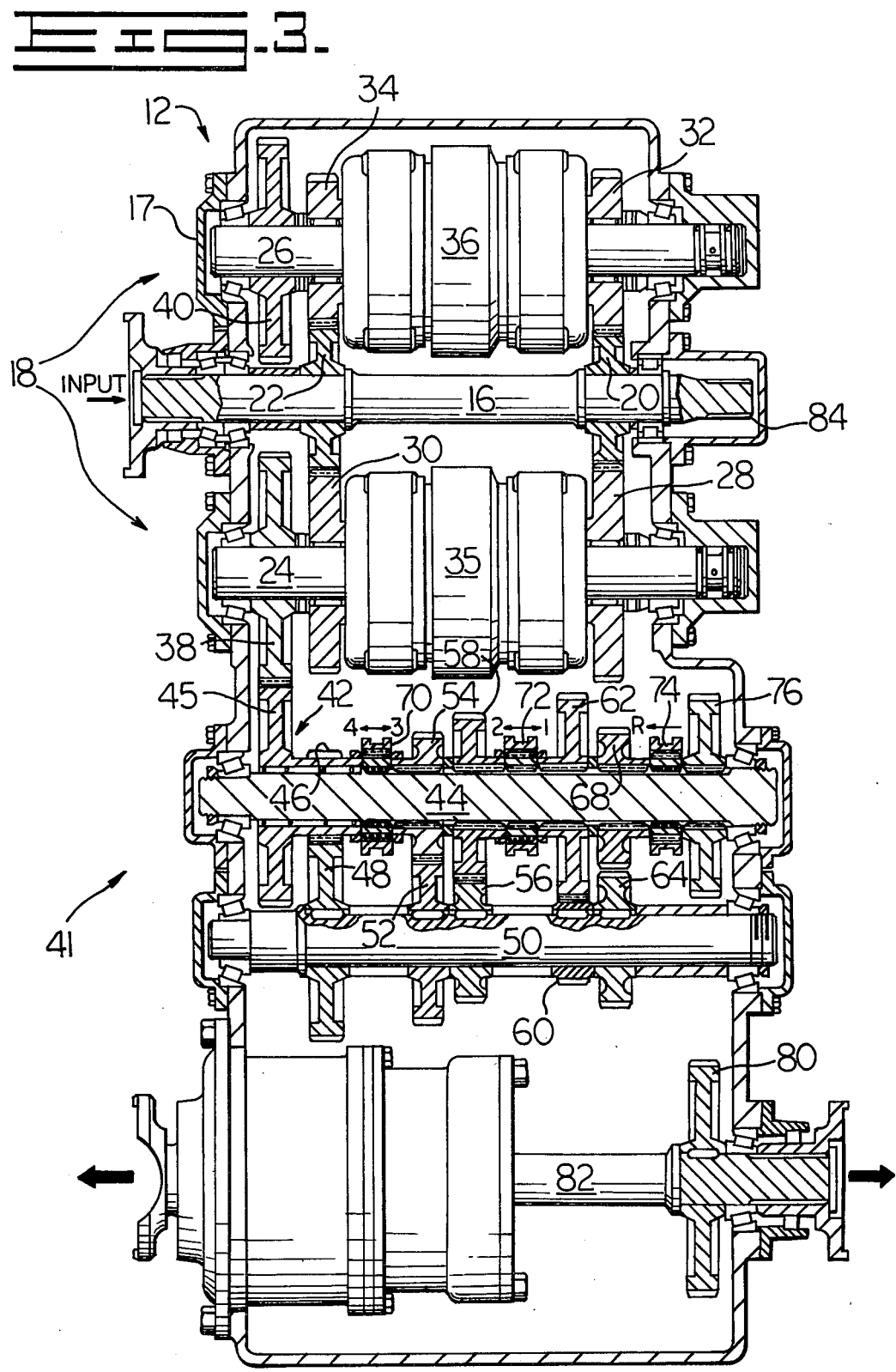
FIG. 3 is a section view taken at angled line III—III of FIG. 2 illustrating the transmission.

More particularly, manual shift section may be structured as in the embodiment hereafter described. Drivingly mounted on countershaft 50 adjacent to spur gear 48 is a spur gear 52 intermeshing with a range gear 54 rotatably mounted on transfer shaft 44. Drivingly mounted adjacent to spur gear 52 is a spur gear 56 mating with a range gear 58 rotatably mounted on transfer shaft 44. Drivingly mounted adjacent to spur gear 56 on countershaft 50 is a spur gear 60 in intermeshing relationship with a range gear 62 rotatably mounted on transfer shaft 44. Immediately adjacent to spur gear 60, a spur gear 64 is drivingly mounted on countershaft 50. Spur gear 64 intermeshes with a reverse idler 66 mounted on a shaft 67 (See FIG. 2), and which intermeshes with a reverse range gear 68 rotatably mounted on transfer shaft 44. Disposed between pinion gear 46 and range gear 54 is a drive engagement means 70 of the conventional shift fork and coupling collar configuration well known in the art. Suitable sizing of the aforementioned spur gears and range gears allows movement of drive engagement means 70 to the left as depicted in FIG. 3 to provide a manual fourth range drive ratio by engaging pinion 46 of cluster gear 42 with transfer shaft 44 while movement of drive engagement means 70 to the right as depicted in FIG. 3 engages range gear 54 with transfer shaft 44 to provide a manual third range drive ratio. Similarly disposed between range gear 58 and range gear 62 is a second drive engagement range means 72 of the same type as drive engagement means 70. Again, with suitable sizing of the spur and range gears, movement to the left of drive engagement means 72 as depicted in FIG. 3 provides a manual second range drive ratio while movement to the right provides a manual first range drive ratio. Drive engagement means 70 and drive engagement means 72 are illustrated in the neutral position in FIG. 3. A reverse drive engagement means 74 is also provided on transfer shaft 44 and is similar in construction to drive engagement means 70. Movement of reverse drive engagement means 74 to the left as shown in FIG. 3 engages reverse range gear 68, which is driven by reverse idler 66 (See FIG. 2) with transfer shaft 44 thereby providing a reverse range in the transmission.

A drive connection to output shaft 82 is accomplished in part by transfer gear 76, drivingly mounted at the end opposite cluster gear 42 of transfer shaft 44. Transfer gear 76 is in intermeshing relationship with an idler gear 78 mounted on a shaft 79 (See FIG. 2) and which is in intermeshing relationship with a spur gear 80, spur gear 80 being drivingly mounted on output shaft 82. Output shaft 82 is rotatably mounted in housing 17 in substantially parallel relationship to input shaft 16 and physically located at the bottom of the transmission as illustrated in FIG. 2. Positioning of output shaft 82 at the bottom of housing 17 allows output at either end of transmission housing 17 for appropriate interconnection by propeller shafts 94 and 95 with front and rear vehicle drive wheels 97 and 98 without the need for a transfer case. Transmission housing 17 may be constructed and formed so that there is additional space within the transmission housing in the vicinity of output shaft 82 below countershaft 50 to allow for the incorporation of various accessories.

Also provided in the transmission is a power take-off connection shown as spline 84 at the end opposite the input of input shaft 16.

Control of the transmission may be through the conventional levers mounted convenient to the operator. Such control levers are illustrated schematically in FIG. 4 with a power shift control lever 86 interconnected through a linkage 87 to a fluid pressure apparatus 88 which in turn may actuate the selected clutch element in clutch 35 or clutch 36. A manual shift lever 89 is linked to drive engagement means 70 and 72 and reverse drive engagement means 74 through a linkage 90. Fluid pressure apparatus 88 and linkage 90 would be of conventional design well known in the art and are not herewith described in detail.

Operation of transmission 12 requires a selection of the manual shift range before the vehicle is put in motion since the drive engagement means 70, 72 and reverse drive engagement means 74 involve direct intermeshing of gearing without clutch elements. Once a desired manual range gear has been selected, a power shift range is selected to complete the drive train from input shaft 16 to output shaft 82, thenceforth the vehicle may be operated in a normal manner with additional power shifting available while the vehicle is underway. Thus the vehicle is provided with a plurality of power shift ranges during underway operations, with the added capability of additional number of speed ranges selectable upon stopping the vehicle as described above. Reverse operation, as noted above, requires bringing the vehicle to a stop and disengagement of the power shift clutches 36 and 35 with subsequent engagement of range gear 68 with transfer shaft 44.

The plurality of power shift ratios and manual shift ratios of the preferred embodiment described herein provides 16 forward drive ratios and four reverse drive ratios. By sizing and ratioing the intermeshing gears utilized in the power shift section and the manual shift section, of this embodiment the incremental vehicle speed changes between required shift points can be less than heretofore available in agricultural tractors, all the while allowing the vehicle engine to run at or close to an optimum speed over a relatively broad range of vehicle operating speeds, thus insuring the efficiency which is one of the objects of this invention.

Although the preferred embodiment described herein provides a novel combination of four power shifts and four manual shifts to provide the aforementioned 16 forward speeds and four reverse speeds, various other combinations of power shifts and manual shifts should be obvious to those well versed in the art. Such combinations can be structured to utilize the vertical arrangement of the transmission herein disclosed which provides output at both the front and the rear of the transmission housing.

What is claimed is:

1. A transmission comprising:
a housing;
an input shaft rotatably mounted in the upper portion of said housing;
an output shaft rotatably mounted in said housing in substantially parallel relationship to said input shaft and spatially removed therefrom, said output shaft extending outwardly from the lower portion of said housing at opposite ends thereof;
first and second drive gears drivingly mounted on said input shaft;
first and second intermediate shafts rotatably mounted in substantially parallel relation to said input shaft and between said input shaft and said output shaft;
first and second power shift gears respectively intermeshing with the first and second drive gears, and rotatably mounted on the first intermediate drive shaft;
third and fourth power shift gears respectively intermeshing with the first and second drive gears, and rotatably mounted on the second intermediate drive shaft;
clutch means operable for selectively engaging each one of the plurality of intermediate drive gears with its respective intermediate shaft;
first and second spur gears each drivingly mounted respectively on said first and second intermediate shaft;
a transfer shaft rotatably mounted in said housing in a substantially parallel relation to said input shaft;
a cluster gear rotatably mounted on said transfer shaft and driven by said first and second spur gears;
a plurality of range gears rotatably mounted on said transfer shaft;
a countershaft rotatably mounted in said housing in substantially parallel relation to said input shaft;
a countershaft drive gear drivingly mounted on said countershaft and drivingly engaging said cluster gear;

a plurality of countershaft spur gears drivingly mounted on said countershaft and each engaging a range gear;

a plurality of drive engagement means operable for selectively drivingly connecting said range gears to said transfer shaft;

transfer gear means interconnecting said transfer shaft with said output shaft for driving said output shaft.

2. The transmission as set forth in claim 1 further comprising:

a reverse countershaft spur gear drivingly mounted on the countershaft;

a reverse idler gear means engaging said reverse countershaft gear;

a reverse spur gear rotatably mounted on the transfer shaft; and, reverse drive engagement means operable for selectively engaging said reverse spur gear with said transfer shaft.

3. The transmission as set forth in claim 2 wherein the plurality of drive engagement means comprise;

a high range drive engagement means operably moveable in a first direction for selectively engaging the cluster gear with the transfer shaft.

4. The transmission as set forth in claim 3 wherein the transfer gear means comprises:

a transfer gear drivingly mounted on said transfer shaft;

an output gear drivingly mounted on said output shaft; and, idler gear means drivingly interconnecting said transfer gear with said output gear.

5. The transmission as set forth in claim 4 wherein said input shaft further comprises an input shaft having a power take off connection at one end.

6. The transmission as set forth in claim 1 wherein the clutch means for selectively engaging one of the plurality of intermediate drive gears with its respective intermediate shaft comprises:

a low range clutch assembly coaxially mounted with said first intermediate shaft and selectively operable to engage the first power shift gear with said first intermediate shaft and selectively operable to engage the second power shift gear with said first intermediate shaft; and a high range clutch assembly coaxially mounted with said second intermediate shaft and selectively operable to engage the third power shift gear with said second intermediate shaft and selectively operable to engage the fourth power shift gear with said second intermediate shaft.

7. The transmission as set forth in claim 6 wherein said first and second spur gears mounted respectively on said first and second intermediate shafts are of equal diameter.

8. The transmission as set forth in claim 7 wherein the plurality of range gears rotatingly mounted on said transfer shaft comprise:

a first range gear;

a second range gear; and, a third range gear;

and wherein said plurality of drive engagement means further comprises a low range drive engagement means mounted on said transfer shaft between said first range gear and said second range gear and operably movable in a first direction to selectively engage the first range gear with the transfer shaft and operably movable in a second direction to selectively engage the second range gear with the transfer shaft; and, further wherein said high range drive engagement means is mounted on said transfer shaft between the cluster gear and the third range gear and is further operably moveable in a second direction to selectively engage said third range gear with said transfer shaft.

9. The transmission as set forth in claim 8 wherein said input shaft is mounted above the transfer shaft and the countershaft; and further wherein said output shaft is mounted below said transfer shafts and said countershaft.

* * * * *